United States Patent [19]
Tanaka et al.

[11] 3,889,167
[45] June 10, 1975

[54] DEVICE FOR CONTROLLING SPEED OF THREE-PHASE INDUCTION MOTOR

[75] Inventors: Tsuyoshi Tanaka, Chiba; Hisakazu Ninomiya, Narashino, both of Japan

[73] Assignee: Hitachi, Ltd., Japan

[22] Filed: Nov. 26, 1973

[21] Appl. No.: 418,808

[30] Foreign Application Priority Data
Nov. 29, 1972  Japan............................. 47-119019
Jan. 24, 1973  Japan................................. 48-9532
Apr. 4, 1973   Japan............................... 48-37807

[52] U.S. Cl. ................ 318/227; 318/138; 318/230; 318/231
[51] Int. Cl. ............................................ H02p 5/40
[58] Field of Search .......... 318/227, 230, 231, 138, 318/254; 321/7, 66

[56] References Cited
UNITED STATES PATENTS

| | | | |
|---|---|---|---|
| 3,320,506 | 5/1967 | Humphrey | 318/227 X |
| 3,522,502 | 8/1970 | Tuchen | 318/227 X |
| 3,742,336 | 6/1973 | Bedford | 321/7 X |
| 3,780,362 | 12/1973 | Stromin et al. | 318/254 |

*Primary Examiner*—G. Z. Rubinson
*Attorney, Agent, or Firm*—Craig & Antonelli

[57] ABSTRACT

A three-phase induction motor is connected through a circuit consisting of six switching elements, with a single-phase power source and the motor is run at low speed by a novel device which is neither of cycloconverter type nor inverter type.

2 Claims, 20 Drawing Figures

DEVICE FOR CONTROLLING SPEED OF THREE-PHASE INDUCTION MOTOR

BACKGROUND OF THE INVENTION

1. Field of the Invention

This invention relates to a device for controlling the speed of a three-phase induction motor and more particularly to the low speed operation of a three-phase induction motor by connecting the motor with a single-phase power source.

The present invention belongs basically to the frequency control type but also employs voltage control and even the control of the secondary resistance, if the three-phase induction motor is of wound-rotor type, so as to make the range of speed control broader.

2. Description of the Prior Art

In low speed performance, frequency control is considered to be more effective than voltage control or secondary-resistance control.

Typical examples of conventional devices using the principle of frequency control are cycloconverters and inverters. They have very wide ranges of speed control. As regards cycloconverters, however, they need at least 18 main switching means where they are used to control a three-phase induction motor. Switching means for small current use are not expensive but those switching means which can be used to control a three-phase induction motor of higher than several kilowatts, are very expensive. Accordingly, the cycloconverter type speed control device necessarily becomes costly.

On the other hand, an inverter can be constructed only by six main switching means whereas a cycloconverter needs at least 18 main switching means, as mentioned above. In the case where the inverter is used to control a three-phase induction motor having a rating higher than several kilowatts, thyristors are exclusively used as such main switching elements. Ordinary thyristors, however, have no arc-extinguishing ability and the commutating circuit to be combined with them is very complicated. Thus, the inverter is also costly though it is less expensive than the cycloconverter.

Namely, the cycloconverter and the inverter, which employ frequency control, have an advantage that they have an efficiency in low speed performance, higher than the system employing voltage or secondary-resistance control and that the range of speed control is very wide, but they also have a drawback that the cost is very high.

In the case where the range of the speed control is not so wide or where the mode of speed control need not be continuously variable but may be stepwise variable, an inverter or a cycloconverter may be designed according to the requirements. Even in such a case, the cycloconverter needs at least 18 main switching elements and the inverter has to be furnished with a commutating circuit. Consequently, the production cost cannot be appreciably lowered. For this reason, the application of the speed control device for three-phase induction motor using a cycloconverter or an inverter is limited solely to such a field as the spinning industries where precise speed control is essential, though the extent of application grows wider gradually.

The U.S. Pat. No. 3,320,506 specification discloses the system in which the low speed control of a three-phase induction motor is performed by a smaller number of switching elements. According to the system, the induction motor is powered by a single-phase supply source. It may be said that as far as the inventors know, the patented system most resembles the present invention in every respect. However, the system cannot use any induction motor except one having its primary winding connected in star-configuration with a terminal provided at the neutral point. Such an induction motor having star-connected primaries and a neutral terminal is usually made according to a user's special order so that it is hard to obtain.

SUMMARY OF THE INVENTION

One object of the present invention is to provide a device for controlling the speed of a three-phase induction motor, which needs a smaller number of main switching elements than the cycloconverter.

Another object of the present invention is to provide a device for controlling the speed of a three-phase induction motor, which is constructed by main switching elements having no arc-extinguishing ability but needs no separate commutating circuit.

An additional object of the present invention is to provide a device for controlling the speed of a three-phase induction motor, which is less expensive than the conventional cycloconverter and inverter.

A further object of the present invention is to provide a device for controlling the speed of a three-phase induction motor, which can produce a specific low speed and a speed approximately equal to the synchronous speed determined by the number of pole pairs of the induction motor and the frequency of a three-phase power source to be used, with the aid of a few additional main switching elements.

A yet another object of the present invention is to provide a device for controlling the speed of a three-phase induction motor, which can be used with the induction motor having either star-connected or delta-connected primary winding.

Namely, according to the present invention, a three-phase induction motor is connected with a single-phase power source through six arms constituted of switching elements. Three circuits, each being formed of two arms or switching elements connected in series, are connected in parallel with each other and with the single-phase source. Each arm may be constructed by a single switching element or by two switching elements connected in inverse parallel configuration. As such switching elements may be used transistors, SCR's (Trade Mark), which hereinafter are called thyristors, and FLS's (Trade Mark). An FLS can be considered as equivalent to two switching elements connected in inverse parallel configuration. The terminals of the three-phase induction motor are connected with the junction points of the series-connected switching elements. The primary winding of the motor may be in the star- or delta-connection. The switching elements or arms are controlled in synchronism with the voltage of the single-phase a.c. source, by conduction control means. And the switching elements are fired so that one ignition cycle of the six switching elements may be completed at a period of $3n$ ($n$ is a positive integer). If FLS's are used as the switching elements, the cycle is completed at a period of $(3/2)n$ since each of them is equivalent to two ordinary switching elements connected in inverse parallel configuration. In this case, it is necessary that two of the six switching elements should be in conduction at the same time; the two elements being not those connected with each other and one of them being connected with one terminal of the single-phase a.c. source while the other is connected with the other terminal of the a.c. source. In this way, a control device can be constructed with six switching elements and even in the case where each arm is constituted of two elements, 12 switching elements can suffice for the purpose. Therefore, the number of switching elements used here is smaller than that of the switching elements used in the cycloconverter, i.e. 18 elements at least. Moreover, since an a.c. power source is used, no commutating circuit is needed. Accordingly, the completed device will be less expensive than the cycloconverter and the thyristor inverter.

If each of the groups, each of which consists of two arms, is connected between two of the three terminals of a three-phase power source and if the inverse parallel circuit of two thyristors is connected between the remaining terminal of the three-phase source and any one of the junction points of series-connected switching elements constituting the groups, then the velocity $V_s$ of the rotating magnetic field of the induction motor can be made equal to $120f/p$ [rpm], where f is the frequency of the three-phase power source and p is the number of poles of the motor. It is also possible to replace the thyristors in inverse parallel connection by an FLS.

Other objects, features and advantages of the present invention will be apparent when anyone skilled in the art reads the following description of the specification with the aid of the attached drawings.

DESCRIPTION OF THE PREFERRED EMBODIMENTS

An embodiment of the present invention will be described with the aid of FIGS. 1 to 5.

Figure 1:
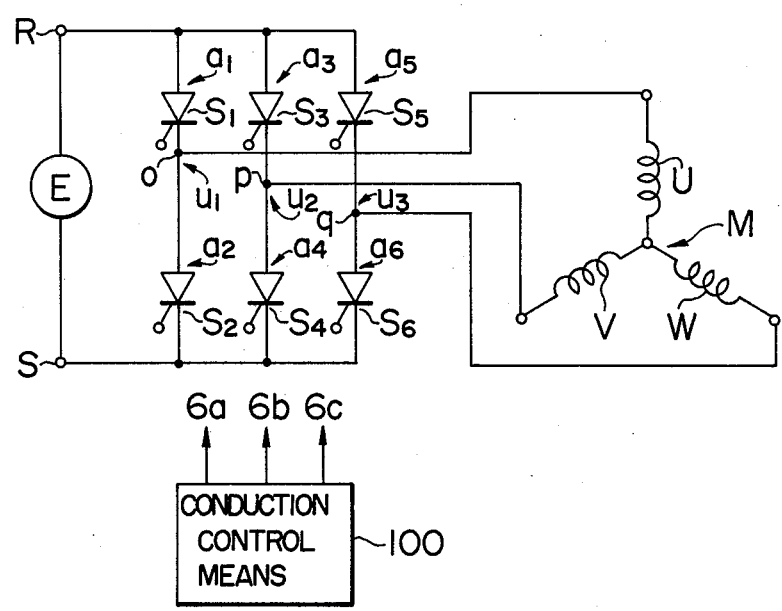
FIG. 1 is a circuit of a control device as one embodiment of the present invention.
Figure 2:
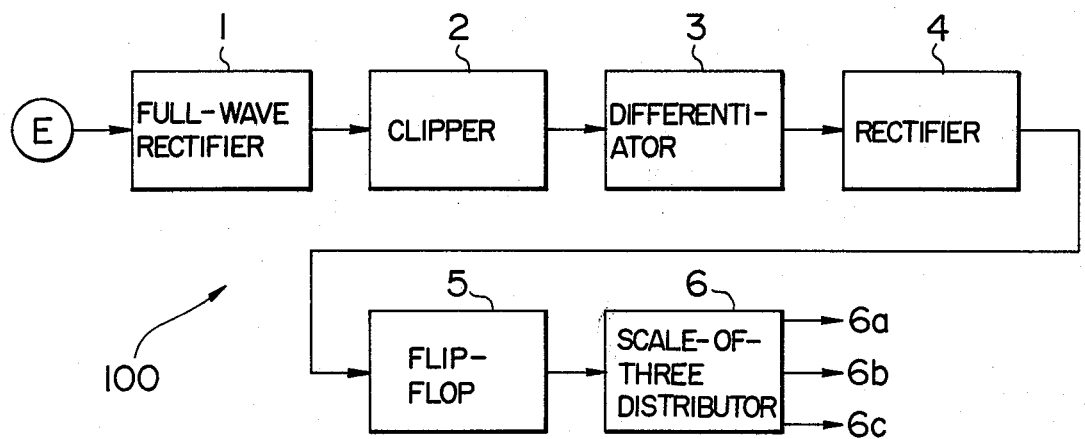
FIG. 2 is a block diagram of a conduction control means.

Thyristors $S_1$ to $S_6$ respectively form arms $A_1$ to $A_6$. The arms $A_1$ and $A_2$, $A_3$ and $A_4$, and $A_5$ and $A_6$ are connected respectively in series with each other to form three units $U_1$ to $U_3$. The three units $U_1$ to $U_3$ are connected in parallel to a single-phase a.c. power source E. The junction points $o, p$ and $q$ of the arms $A_1$ and $A_2$, $A_3$ and $A_4$, and $A_5$ and $A_6$ are connected with the terminals of the primary winding of a three-phase induction motor M. The primary winding has three coils U, V and W corresponding to respective phases. A conduction control means 100 has such a constitution as shown in FIG. 2.

Figure 3:
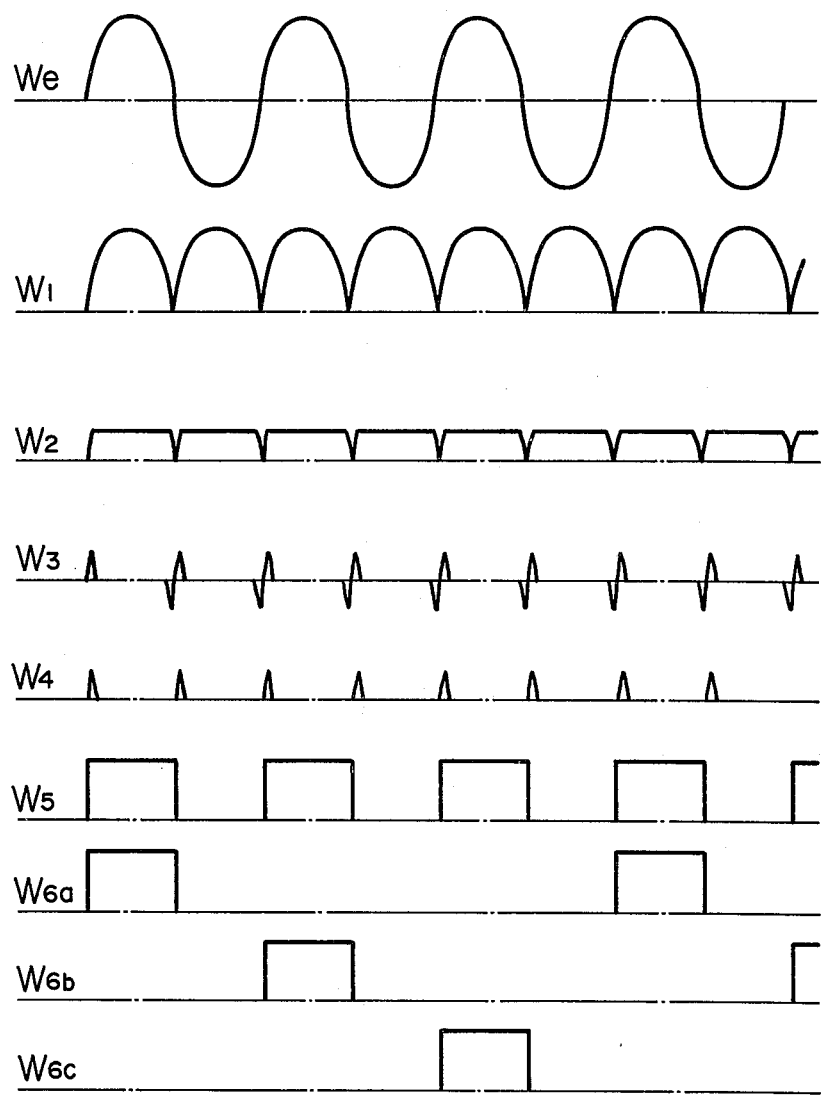
FIG. 3 is a time chart illustrating the operation of the conduction control means shown in FIG. 2.
Figure 4:
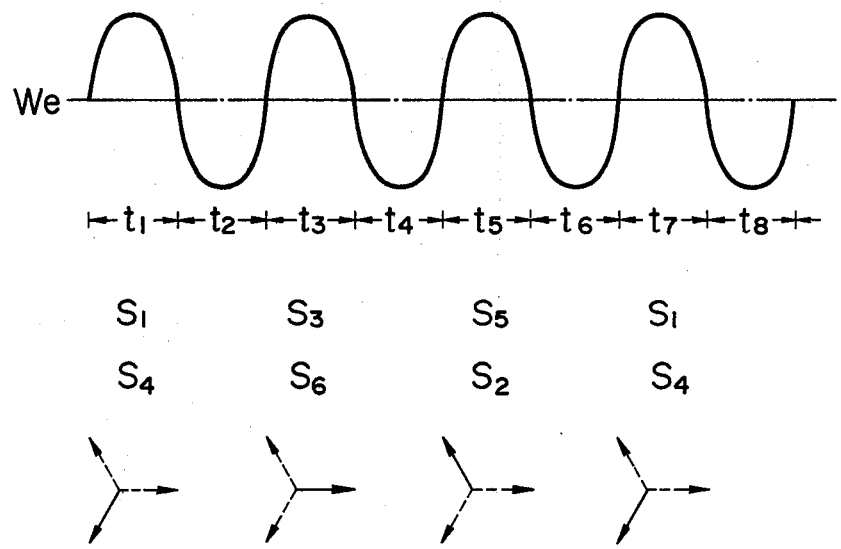
FIGS. 4 and 5 are diagrams useful to explain the operation of the control device shown in FIG. 1.
Figure 5:
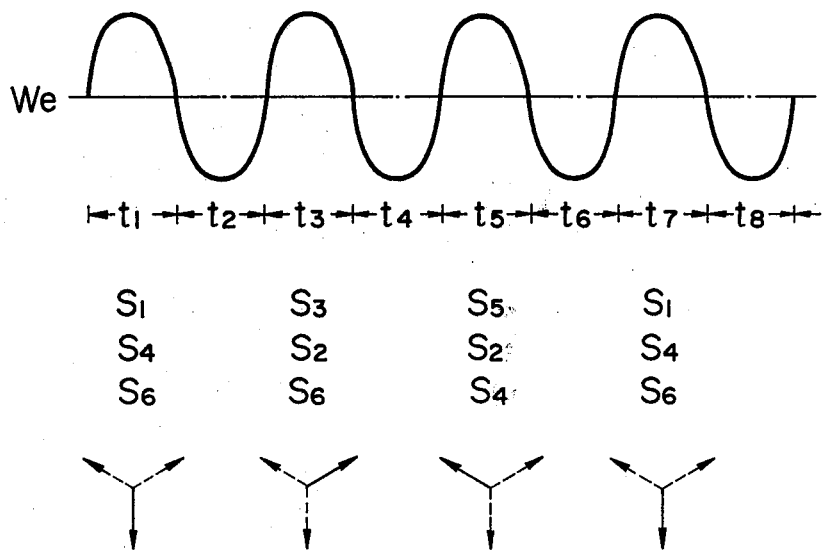

Namely, the voltage $W_e$ (see FIG. 3) of the single-phase a.c. power source E is rectified through a full-wave rectifier 1 to form a waveform indicated by $W_1$ in FIG. 3. The output of the full-wave rectifier 1 is applied to a clipper 2 to form a waveform $W_2$. The output of the clipper 2 is fed to a differentiator 3 to generate a waveform $W_3$. The output of the differentiator 3 is impressed upon a rectifier 4 to produce a waveform $W_4$ in which the negative portions are removed. The output of the rectifier 4 is sent to a flip-flop 5 to deliver an output having a waveform $W_5$. The output of the flip-flop 5 is received by a scale-of-three distributor 6 which delivers outputs $W_{6a}$, $W_{6b}$ and $W_{6c}$ respectively at the output terminals 6a, 6b and 6c. The signal at the terminal 6a is applied to the gates of the thyristors $S_1$ and $S_4$, the signal at the terminal 6b to the gates of the thyristors $S_3$ and $S_6$, and the signal at the terminal 6c to the gates of the thyristors $S_5$ and $S_2$. Then, during the positive half cycle $t_1$ of the voltage $W_e$ at the terminal R of the single-phase a.c. power source E, the thyristors $S_1$ and $S_4$ are rendered conductive to cause current flow from phase U to phase V so that the magnetic field of the three-phase induction motor M is shown in FIG. 4. During the next half cycle $t_2$, i.e. positive half cycle of the voltage $W_e$ at the terminal S of the a.c. source E, no thyristor is conductive. During the half cycle $t_3$ in which the terminal R is maintained at positive potential, the thyristors $S_3$ and $S_6$ conduct to cause current to flow from phase V to phase W so that the magnetic field in the motor M established by the primary winding is as shown in FIG. 4. During the next half cycle $t_4$ in which the potential at the terminal S is positive, no thyristor is conductive. During the next half cycle $t_5$, the thyristors $S_5$ and $S_2$ conduct to cause current to flow from phase W to phase U so that the magnetic field in the motor M is as shown in FIG. 4. During the next half cycle $t_6$, no thyristor is conductive. Thereafter, the foregoing process is repeated. It follows, therefore, that the velocity $V_s$ of the rotating field in the motor M is such that $V_s = 120f/p \cdot (1/3)$ [rpm]

the rotation of the field being counterclockwise.

It is also possible to apply the output at the terminal 6a of the distributor 6 to the thyristors $S_1$, $S_4$ and $S_6$, the output at the terminal 6b to the thyristors $S_3$, $S_2$ and $S_6$ and the output at the terminal 6c to the thyristors $S_5$, $S_2$ and $S_4$. In this case, the mode of the rotating magnetic field is as shown in FIG. 4 and the velocity of the rotating field is the same as in the previously described case described with FIG. 4.

In order to make the direction of the rotating magnetic field clockwise, it is only necessary to apply the output at the terminal 6a of the distributor 6 to the thyristors $S_1$ and $S_4$, the output at the terminal 6b to the thyristors $S_5$ and $S_2$, and the output at the terminal 6c to the thyristors $S_3$ and $S_6$.

Figure 6:
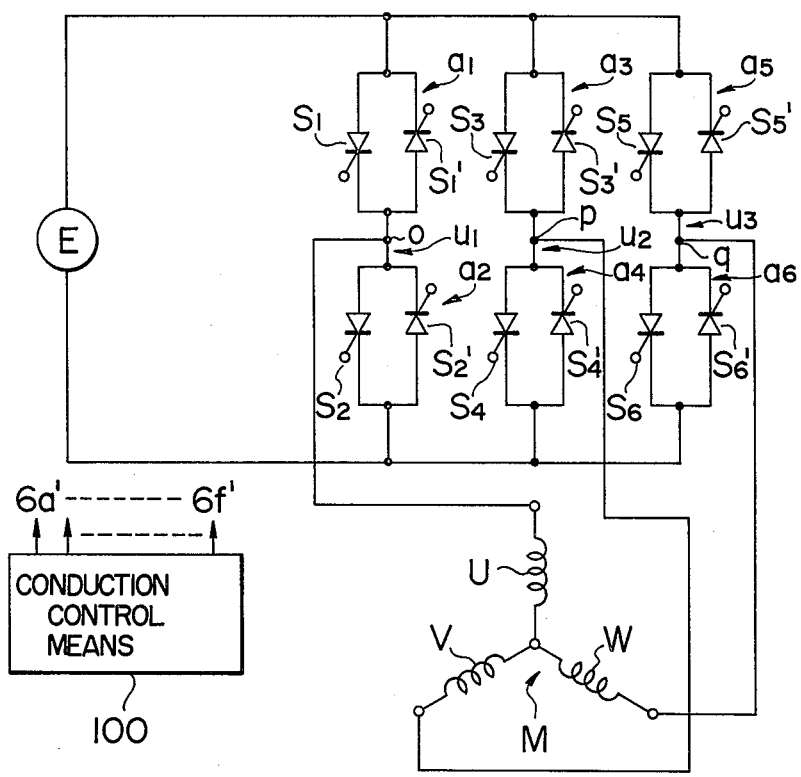
FIG. 6 is a circuit of a control means as another embodiment of the present invention.

FIG. 6 shows a control device as another embodiment of the present invention. This device differs from that shown in FIG. 1 in that each of the arms $a_1$ to $a_6$ consists of two thyristors arranged in inverse parallel connection. Namely, thyristors $S_1'$ to $S_6'$ are additionally provided.

Figure 7:
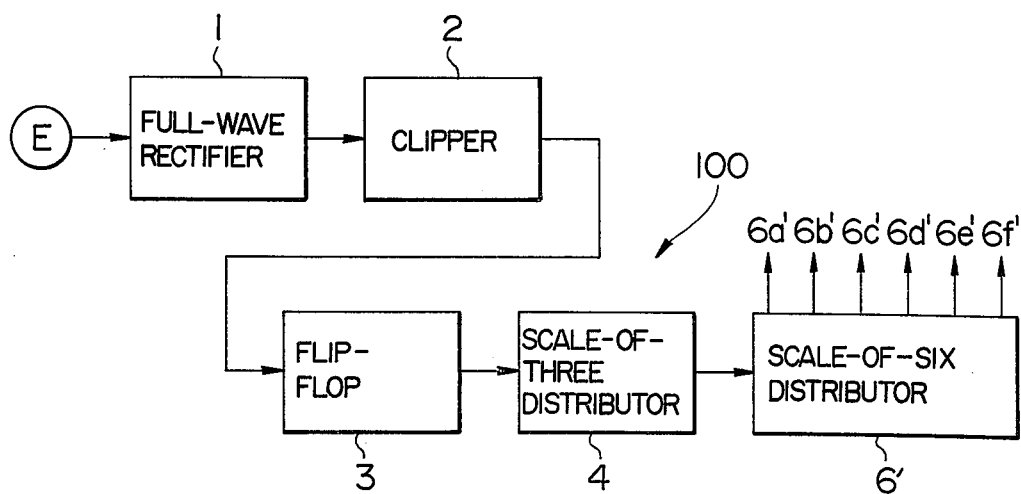
FIG. 7 is a block diagram of another conduction control means.

FIG. 7 shows another example of the conduction control means 100. In the conduction control means shown in FIG. 7, the current from a single-phase a.c. power source E is rectified by a full-wave rectifier 1 to form a waveform $W_1$ as shown in FIG. 8; the output of the full-wave rectifier 1 is applied to a clipper 2 to generate a waveform $W_2$; the output of the clipper 2 is fed to a differentiator 3 to produce a waveform $W_3$; and the output of the differentiator 3 is received by a rectifier 4 which removes the negative portions of the received signal waveform to obtain a waveform $W_4$, these steps being the same as in the conduction control means shown in FIG. 2.

Figure 8:
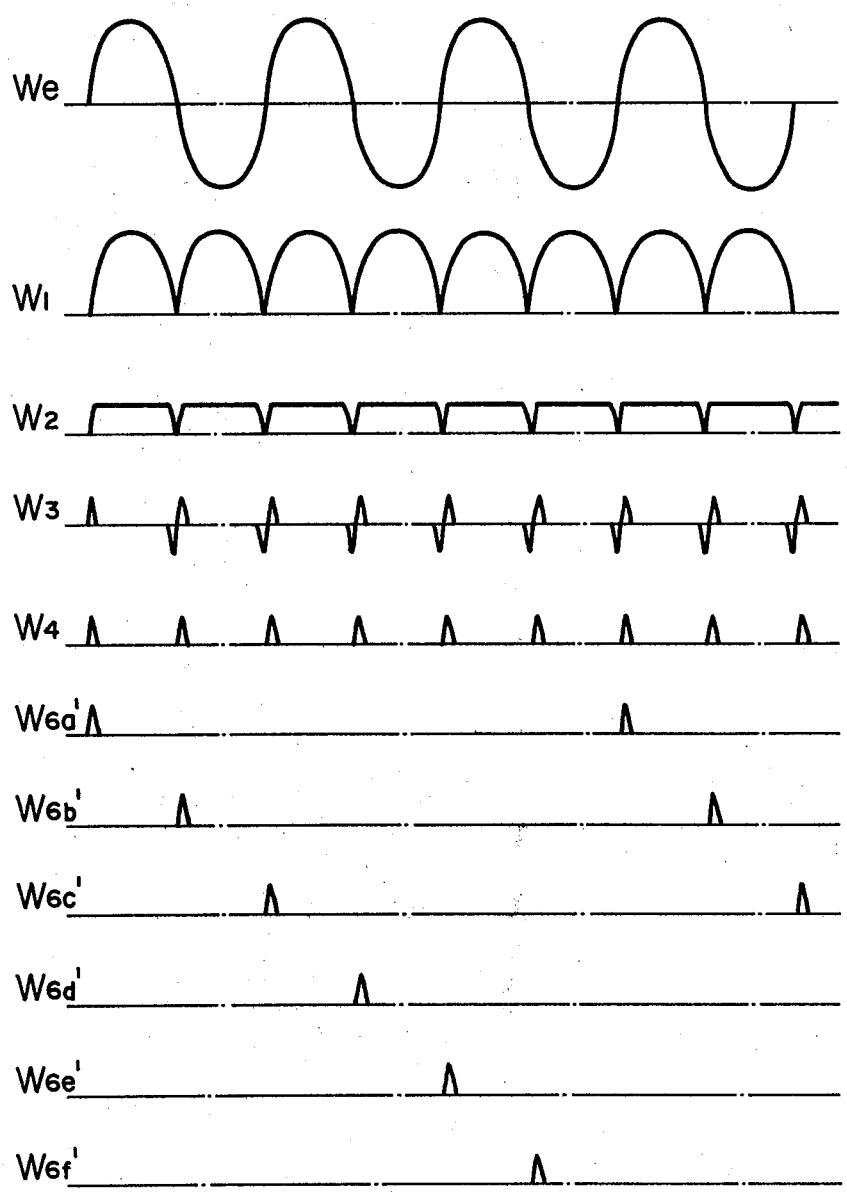
FIG. 8 is a time chart illustrating the operation of the conduction control means shown in FIG. 7.
Figure 9:
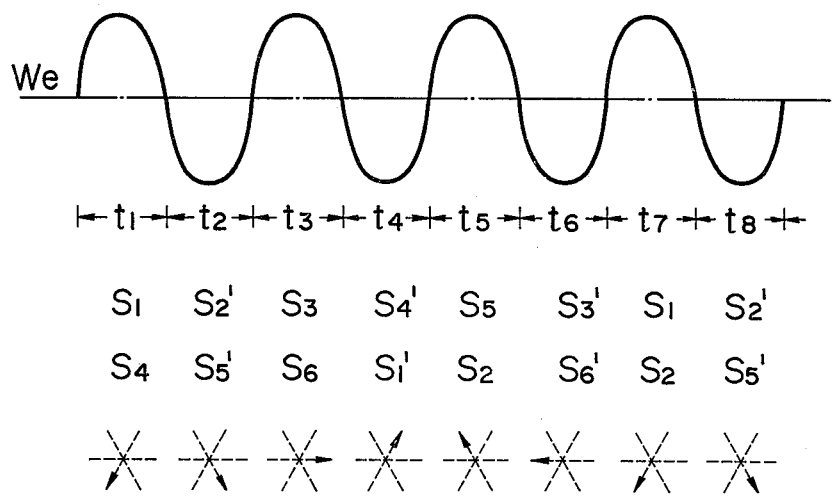
FIGS. 9 to 12 are diagrams useful to explain the operation of the control device shown in FIG. 6.

In this embodiment shown in FIG. 7, however, the following steps are different: the output of the rectifier is fed to a scale-of-six distributor 6', which delivers output signals $W_{6a'}$ to $W_{6f'}$ respectively at the output terminals 6a' to 6f', as shown in FIG. 8. The output of the terminal 6a' is applied to the thyristors $S_1$ and $S_4$, the output of the terminal 6b' to the thyristors $S_2'$ and $S_5'$, the output of the terminal 6c' to the thyristors $S_3$ and $S_6$, the output of the terminal 6d' to the thyristors $S_4'$ and $S_1'$, the output of the terminal 6e' to the thyristors $S_5$ and $S_2$, and the output of the terminal 6f' to the thyristors $S_3'$ and $S_6'$. With this configuration, the rotating magnetic field in the three-phase induction motor M is as shown in FIG. 9 and the velocity $V_s$ of the rotating magnetic field is such that $V_s = 120f/p \cdot (1/3)$ [rpm]

the direction of rotation being counterclockwise.

Figure 10:
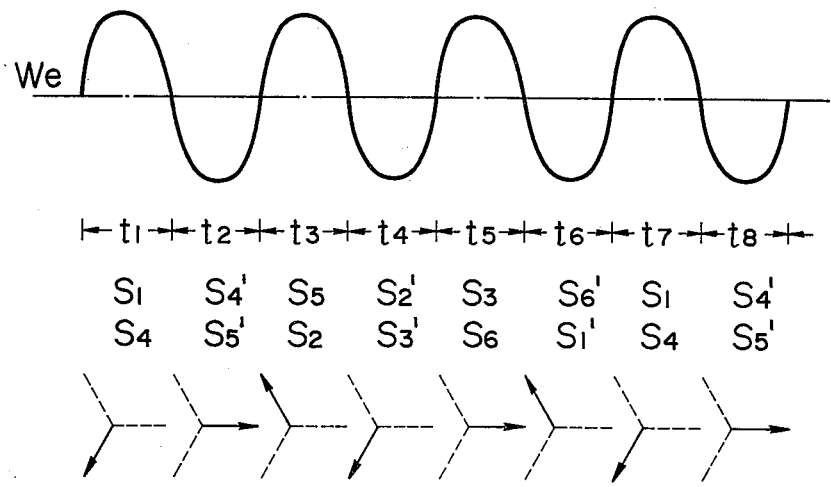

If the output of the terminal 6a' of the distributor 6' is applied to the thyristors $S_1$ and $S_4$, the output of the terminal 6b' to the thyristors $S_4'$ and $S_5'$, the output of the terminal 6c' to the thyristors $S_5$ and $S_2$, the output of the terminal 6d' to the thyristors $S_2'$ and $S_3'$, the output of the terminal 6e' to the thyristors $S_3$ and $S_6$, and the output of the terminal 6f' to the thyristors $S_6'$ and $S_1'$, then the rotating magnetic field of the motor M is as shown in FIG. 10. Hence, it follows that the velocity $V_s$ of the rotating field is such that $V_s = 120f/p \cdot (2/3)$ [rpm]

the direction of rotation being counterclockwise. It is, of course, possible to reverse the direction of rotation by changing the firing of the thyristors $S_1$ to $S_6$ and $S_1'$ to $S_6'$.

Figure 11:
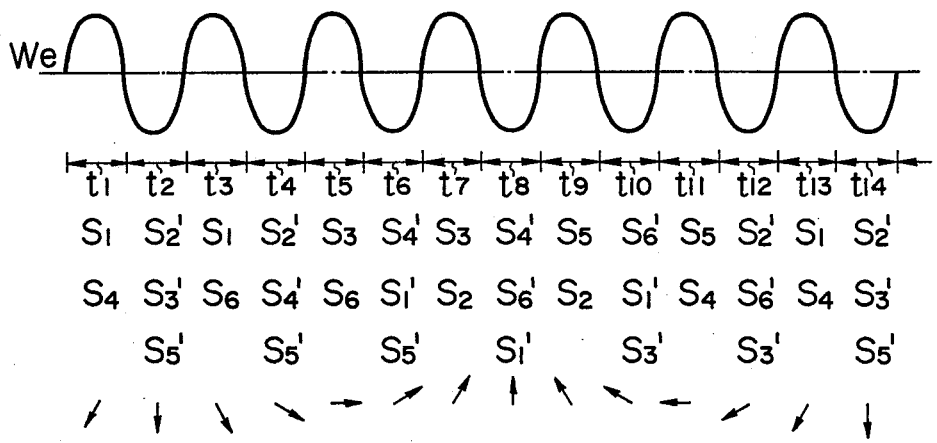
Figure 12:
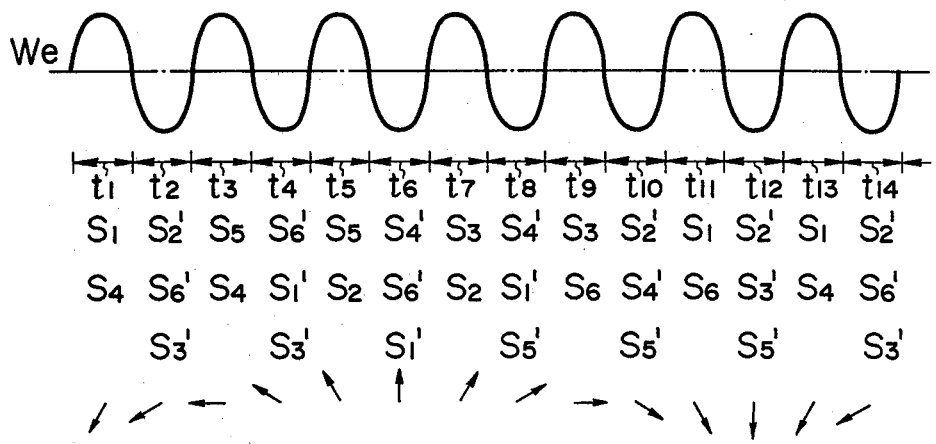

In the case where the scale-of-six distributor 6' is replaced by a scale-of-twelve distributor (not shown) and the thyristors $S_1$ and $S_4$ is fired by the first signal, the thyristors $S_2'$, $S_6'$ and $S_3'$ by the next signal, etc. as shown in FIG. 11, the velocity $V_s$ of the rotating magnetic field is such that $V_s = 120f/p \cdot (1/6)$ [rpm]

the direction of rotation being counterclockwise. In this case, the conduction cycle is completed every six cycles of the source voltage. If it is desired to change the direction of rotation clockwise, it is only necessary to fire the thyristors in order as shown in FIG. 12.

Figure 13:
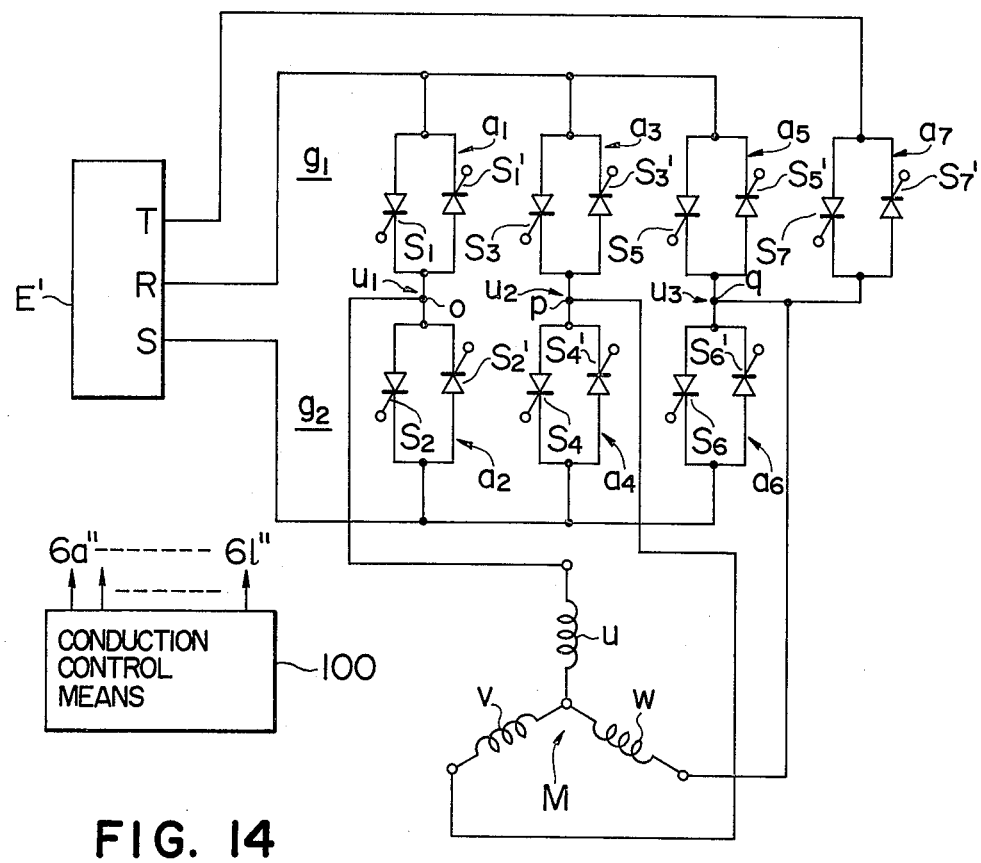
FIG. 13 is a circuit of a control device as another embodiment of the present invention.

FIG. 13 shows a control device as another embodiment of the present invention. This embodiment differs from that shown in FIG. 6 in that a three-phase a.c. power source E' is substituted for the single-phase a.c. source, that the three units $U_1$ to $U_3$ are connected in parallel between the phases R and S and that an arm $a_7$ consisting of thyristors $S_7$ and $S_7'$ connected in inverse parallel configuration is connected between the remaining phase T of the three-phase source E' and the junction point q of the arms $a_5$ and $a_6$. If, in this case, it is desired to operate the motor at high speed, the arms $a_1$, $a_4$ and $a_7$ are controlled so that the velocity of the rotating field may be equal to $120f/p$ [rpm]. The order of firing the thyristors $S_1$ and $S_1'$, $S_4$ and $S_4'$, and $S_7$ and $S_7'$ constituting the arms $a_1$, $a_4$ and $a_7$ is not described in detail since such a way of firing the thyristors is disclosed in the specification of the above mentioned U.S. Pat. No. 3,348,110.

On the other hand, if it is desired to operate the motor at low speed, the thyristors $S_7$ and $S_7'$ are kept cut off while the other thyristors $S_1$ to $S_6$ and $S_1'$ to $S_6'$ are controlled in such a manner as shown in FIG. 10. Accordingly, the velocity of the rotating magnetic field is $(120f/p) \times (2/3) = 80f/p$ [rpm]. If a lower speed is required, the thyristors are controlled in such a manner as shown in FIG. 9, the velocity of the rotating field being $(120f/p) \times (1/3)$ [rpm]. Hereafter, the term "extremely low speed" is applied to an operation of the motor at speeds lower than $120f/p \times (1/3)$ [rpm].

Figure 14:
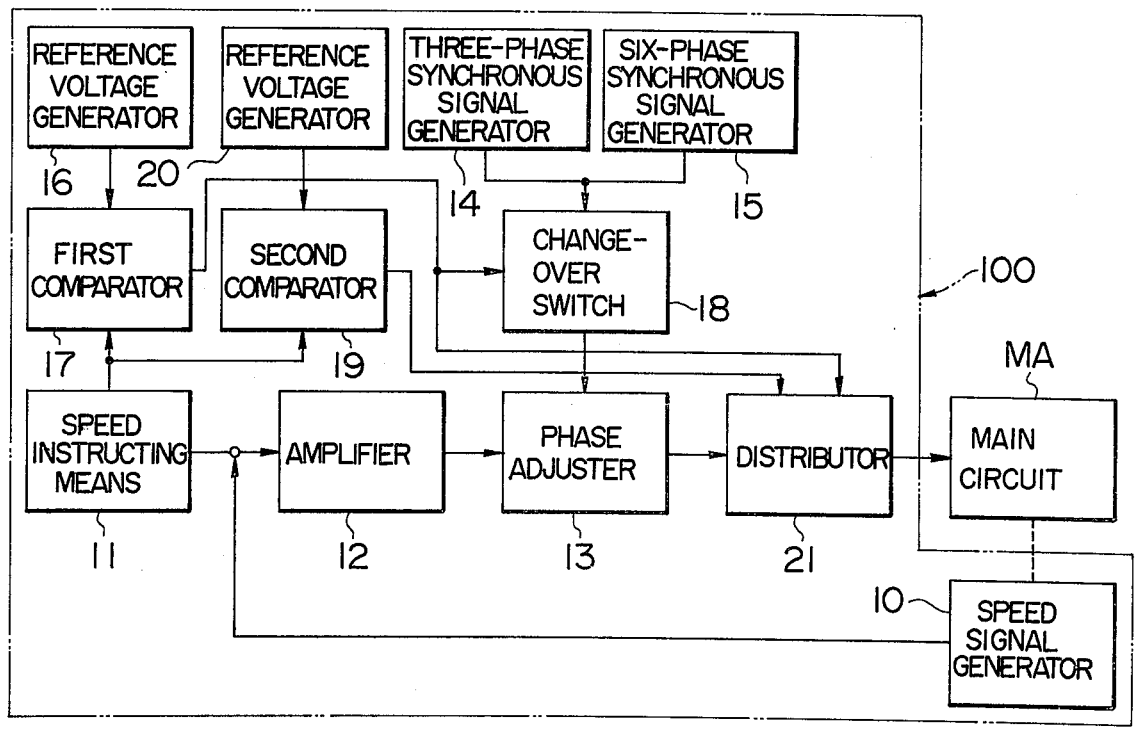
FIG. 14 is a block diagram of another conduction control means.

FIG. 14 shows an example of a conduction control means to realize such controls as described above. In FIG. 14, the box labeled MA is a main circuit in which a three-phase induction motor as a controlled object and thyristors $S_1$ to $S_6$ and $S_1'$ to $S_6'$ are electrically connected as shown in FIG. 13. A speed signal generator 10 delivers an output proportional to the speed of the three-phase induction motor M. The difference between the output of the speed signal generator 10 and a speed instructing means 11 is amplified through an amplifier 12. The output of the amplifier 12 is fed to a phase adjuster 13 so that the output of the amplifier 12 may be integrated in synchronism with the output of a three-phase synchronous signal generator 14 or a six-phase synchronous signal generator 15. When the integrated value reaches a predetermined level, the phase shifter 13 delivers a pulse signal. Whether the phase adjuster 13 begins to integrate the output of the amplifier 12 in synchronism with the output of the three-phase synchronous signal generator 14 or in synchronism with the output of the six-phase synchronous signal generator 15, depends upon the magnitude of the output of the speed instructing means 11. Namely, the output of the means 11 is compared with that of a first reference voltage generator 16 through a first comparator 17. If the output of the means 11 exceeds that of the first reference voltage generator 16, the first comparator 17 delivers an output signal H. If, on the other hand, the output of the speed instructing means 11 is smaller than that of the generator 16, the comparator delivers an output signal L. Signals H and L correspond respectively to "1" and "0" of the binary codes. When the signal H is delivered, it is the case where high speed operation is required. Accordingly, by virtue of a change-over switch 18, the phase adjuster 13 integrates the output of the amplifier 12 in synchronism with the output of the three-phase synchronous signal generator 14. On the other hand, when the signal L is delivered, it is the case where low speed or extremely low speed operation is required. Accordingly, again by virtue of the switch 18, the output of the amplifier 12 is integrated by the phase adjuster 13 in synchronism with the output of the six-phase synchronous signal generator 15. In addition to the first comparator 17, a second comparator 19 is provided, which serves to compare the output of the speed instructing means 11 with the output of a second reference voltage generator 20, the output voltage being smaller than that of the first reference voltage generator 16. If the output of the speed instructing means 11 is smaller than that of the first reference voltage generator 16 but larger than that of the second reference voltage generator 20, then the three-phase induction motor M is to be operated at low speed. And if the output of the means 11 is smaller than that of the second reference voltage generator 20, the motor is to be operated at extremely low speed. A distributor 21 serves to distribute the pulse signals from the phase adjuster 13 to the thyristors $S_1$ to $S_7$ and $S_1'$ to $S_7'$, in response to the outputs of the first and second comparators 17 and 19. Namely, when the first and second comparators 17 and 19 both deliver outputs H, the motor M is to be operated at high speed, so that the pulse signals are applied to the thyristors $S_1$, $S_1'$, $S_4$, $S_4'$, $S_7$ and $S_7'$ in a predetermined sequence. When only the output of the second comparator 19 is H, the motor is to be operated at low speed, so that the thyristors $S_7$ and $S_7'$ are kept cut off while the thyristors $S_1$ to $S_6$ and $S_1'$ to $S_6'$ are rendered conductive in such a sequence as shown in FIG. 10. When both the outputs of the first and the second comparators 17 and 19 are L, the motor is to be operated at extremely low speed, so that the thyristors $S_7$ and $S_7'$ are kept cut off while the thyristors $S_1$ to $S_6$ and $S_1'$ to $S_6'$ are rendered conductive in such a sequence as shown in FIG. 9.

In the foregoing lines, the structure of the conduction control means 100 is described only in block diagram and the detailed description of the parts of the means 100, except a few of them, will not be given here since the speed signal generator 10, the speed instructing means 11, the first and the second reference voltage generators 16 and 20, the first and the second comparators 17 and 19 and the amplifier 12 can be readily replaced by the conventional devices having the same functions.

The three-phase synchronous signal generator 14 is also known as a device which generates three synchronous signals apart in phase from each other by 120 degrees and synchronized with the three phase-to-phase voltages of the three-phase source E' and the description of structure of the generator is also omitted. The phase adjuster 13 can also be replaced by a conventional device but its structure will be slightly touched upon later for convenience' sake.

Figure 15:
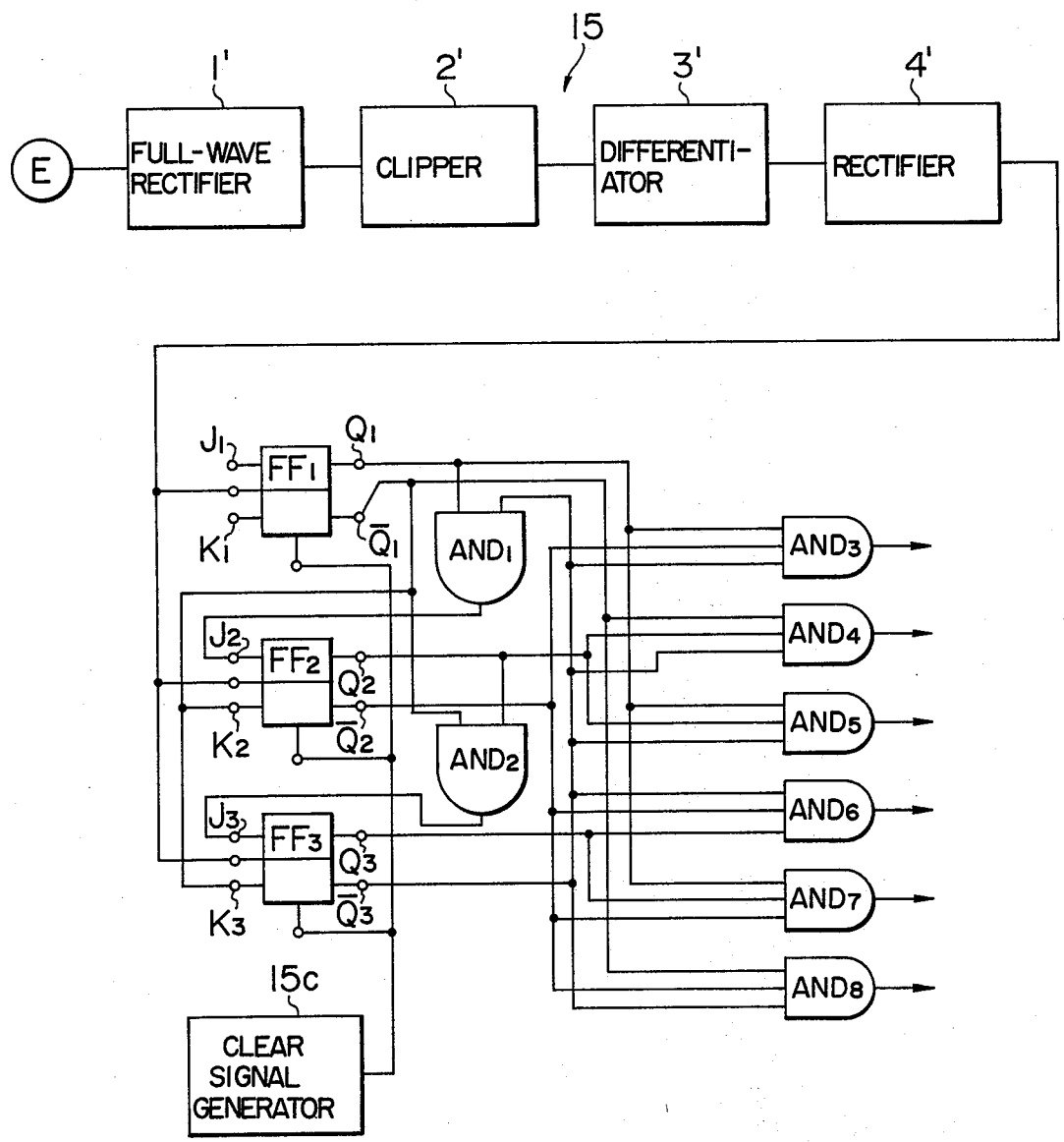
FIG. 15 is a concrete circuit of a six-phase synchronous signal generator used in the conduction control means shown in FIG. 14.
Figure 16:
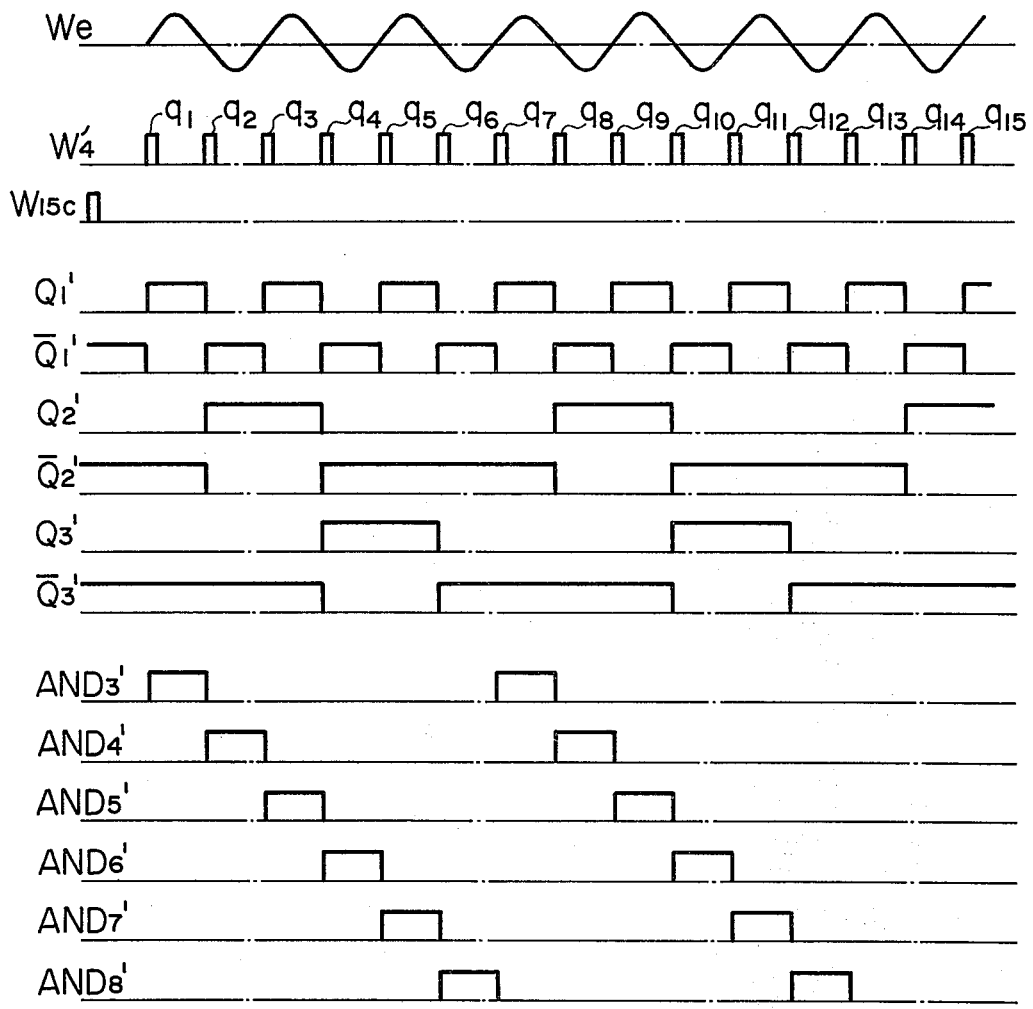
FIG. 16 is a time chart illustrating the operation of the six-phase synchronous signal generator shown in FIG. 15.
Figure 17:
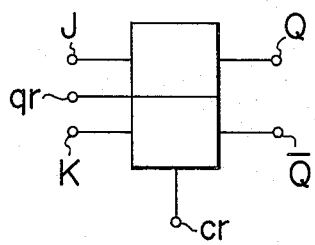
FIG. 17 is a truth table for a J-K flip-flop used in the circuit shown in FIG. 15.

First, a concrete circuit of the six-phase synchronous signal generator 15 will be described with the aid of FIGS. 15 and 16. The voltage $W_c$ of a source E is treated in such a manner as in FIG. 7 and a signal having a waveform $W_4'$ as shown in FIG. 16 is obtained from a rectifier 4'. Namely, reference numerals 1', 2' and 3' in FIG. 15 respectively indicate a full-wave rectifier, a clipper circuit and a differentiating circuit. $FF_1$, $FF_2$ and $FF_3$ designate J-K flip-flops and the truth table for these flip-flops is as shown in FIG. 17. Namely, when both the input terminals J and K receive the signals L, the states of the output terminal Q and $\overline{Q}$ remain unaltered even if a clock signal is applied to the clock terminal qr. When the terminal J receives the signal L and the terminal K receives the signal H, the output of the terminal Q is L and that of the terminal $\overline{Q}$ is H. When the input of the terminal J is H and that of the terminal K is L, the outputs of the terminals Q and $\overline{Q}$ are respectively turned to H and L upon reception of the clock signal at the terminal qr. When the signals H are received by both the input terminals J and K, the outputs of the terminals Q and $\overline{Q}$ are inverted upon reception of the clock signal.

For convenience' sake, the input and the output terminals of a flip-flop $FF_i$ is designated by $J_i$, $K_i$ and $Q_i$, $\overline{Q}_i$ ($i = 1, 2, 3, \ldots$).

The output terminal of the rectifier 4' is connected with the clock terminals qr's of the flip-flops $FF_1$ to $FF_3$ so as to apply the signal $W_4'$ to the clock terminals. The inputs of the terminals $J_1$ and $K_1$ are always kept at H. The output of the terminal $Q_1$ is applied to the terminals $K_2$ and $K_3$ and to an "and" circuit $AND_1$ whose output is applied to the terminal $J_2$. Moreover, the output of the terminal $Q_1$ is applied also to an and circuit $AND_2$ which also receives the output of the terminal $Q_2$ and whose output is applied to the terminal $J_3$.

The outputs of the terminals $Q_1$, $\overline{Q}_2$ and $\overline{Q}_3$ are logically operated through an and circuit $AND_3$.

The outputs of the terminals $\overline{Q}_1$, $Q_2$ and $\overline{Q}_3$ are logically operated through an and circuit $AND_4$.

The outputs of the terminals $Q_1$, $Q_2$ and $\overline{Q}_3$ are logically operated through an and circuit $AND_5$.

The outputs of the terminals $\overline{Q}_1$, $\overline{Q}_2$ and $Q_3$ are logically operated through an and circuit $AND_6$.

The outputs of the terminals $Q_1$, $\overline{Q}_2$ and $Q_3$ are logically operated through an and circuit $AND_7$.

The outputs of the terminals $\overline{Q}_1$, $\overline{Q}_2$ and $\overline{Q}_3$ are logically operated through an and circuit $AND_8$.

A clear signal generator 15c serves to deliver a signal before the synchronous signal generator starts operation, so as to set the outputs of the terminals $Q_1$, $Q_2$ and $Q_3$ at L and those of the terminals $\overline{Q}_1$, $\overline{Q}_2$ and $\overline{Q}_3$ at H.

Before the starting of the operation, a signal $W_{15c}$ as shown in FIG. 16 is delivered by the clear signal generator 15c so that the outputs $Q_1'$, $Q_2'$ and $Q_3'$ of the terminals $Q_1$, $Q_2$ and $Q_3$ are L while the outputs $\overline{Q}_1'$, $\overline{Q}_2'$ and $\overline{Q}_3'$ of the terminals $\overline{Q}_1$, $\overline{Q}_2$ and $\overline{Q}_3$ are H.

If, in this state, the first clock signal $q_1$ is received, the outputs of the terminals $Q_1$ and $\overline{Q}_1$ is inverted, that is, the output of the terminal $Q_1$ is turned to H while that of the terminal $\overline{Q}_1$ is turned to L since the outputs of the terminals $J_1$ and $K_1$ of the flip-flop $FF_1$ are both H.

The flip-flop $FF_2$ maintains the initial state since the outputs of the terminal $Q_1$ and $\overline{Q}_3$ are respectively L and H at the instant when the clock signal $q_1$ is applied and therefore since the output of the and circuit $AND_1$, i.e. the input of the terminal $J_2$, and the input of the terminal $K_2$ are both L.

The flip-flop $FF_3$ also maintains the initial state since the outputs of the terminals $Q_2$ and $Q_1$ are both L and therefore since the output of the and circuit $AND_2$, i.e. the input of the terminal $J_3$, and the input of the terminal $K_3$ are both L.

When the second clock signal $q_2$ is received, $FF_1$ is inverted to deliver outputs L and H respectively at $Q_1$ and $\overline{Q}_1$.

$FF_2$ is also inverted to deliver outputs H and L respectively at $Q_2$ and $\overline{Q}_2$ since before the reception of $q_2$ the output of $Q_1$ had been H so that the output of $AND_1$, i.e. the input of $J_2$, and the input of $K_2$ are both H.

$FF_3$ still maintains the initial state.

As soon as the third signal $q_3$ has been received. $FF_1$ is again inverted but $FF_2$ remains unaltered since the inputs of $J_2$ and $K_2$ are both L at the instant when $q_3$ is received.

$FF_3$ still remains unaltered, maintaining the initial state since the output of $Q_1$ is L at the instant when $q_3$ is received so that the inputs of $J_3$ and $K_3$ are both L.

When the clock pulse $q_4$ is received, $FF_1$ is inverted to deliver outputs L and H respectively at $Q_1$ and $\overline{Q}_1$.

$FF_2$ is also inverted since the outputs of $Q_1$ and $AND_1$ are both H at the instant when $q_4$ is received so that the inputs of $J_2$ and $K_2$ are both H.

$FF_3$ is now inverted for the first time to deliver outputs H and L respectively at $Q_3$ and $\overline{Q}_3$ since the outputs of $Q_1$, $Q_2$ and $AND_2$ are all H at the instant when $q_4$ is received so that the inputs of $J_3$ and $K_3$ are both H.

When the clock signal $q_5$ is received, $FF_1$ is inverted to deliver outputs H and L respectively at $Q_1$ and $\overline{Q}_1$.

$FF_2$ maintains the just previous state with the outputs of $Q_2$ and $\overline{Q}_2$ being respectively L and H.

$FF_3$ also maintains the just previous state, delivering outputs H and L respectively at $Q_3$ and $\overline{Q}_3$.

Upon reception of the sixth clock pulse $q_6$, $FF_1$ is inverted to deliver outputs L and H respectively at $Q_1$ and $\overline{Q}_1$.

$FF_2$ maintains the previous state, delivering outputs L and H respectively at $Q_2$ and $\overline{Q}_2$.

$FF_3$ is inverted to deliver outputs L and H respectively at $Q_3$ and $\overline{Q}_3$.

Thereafter, the above described steps are repeated in sequence.

Namely, $FF_1$ is inverted each time a clock signal is received.

$FF_2$ completes one cycle of operation every six clock pulses. $FF_2$ delivers outputs L and H respectively at $Q_2$ and $\overline{Q}_2$ before the second (counted from the start of operation) pulse has been received. When the second pulse is received, $FF_2$ is inverted and it maintains the state until the fourth clock pulse has been received. As soon as the fourth pulse has been received, $FF_2$ is inverted to deliver outputs L and H respectively at $Q_2$ and $\overline{Q}_2$.

$FF_3$ also completes one cycle of its operation every six clock pulses. $FF_3$ continues to deliver outputs L and H respectively at $Q_3$ and $\overline{Q}_3$ until the fourth (counted from the start of operation) clock pulse has been received. As soon as the fourth pulse has been received, $FF_3$ is inverted and it maintains the state until the sixth clock pulse has been received. Upon reception of the sixth pulse, $FF_3$ is again inverted to deliver outputs L and H respectively at $Q_3$ and $\overline{Q}_3$.

Through the logical operations of these signals appearing at $Q_1$, $\overline{Q}_1$, $Q_2$, $\overline{Q}_2$, $Q_3$ and $\overline{Q}_3$ by means of $AND_3$ to $AND_8$ can be obtained outputs $AND_3'$ to $AND_8'$.

Namely, during three cycles of the source voltage $W_e$, each of $AND_3$ to $AND_8$ delivers an output H corresponding to half cycle of $W_e$, as shown in FIG. 16.

Figure 18:
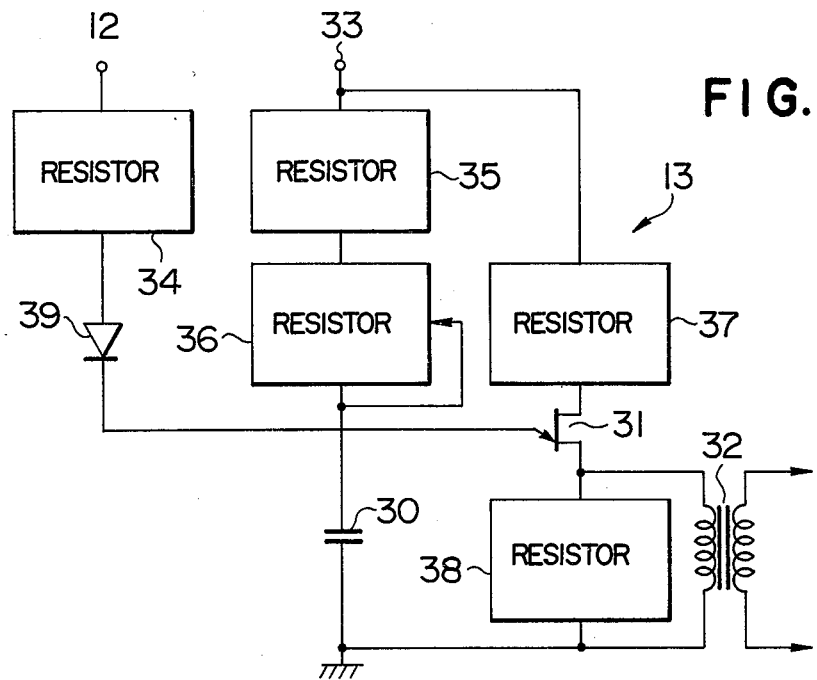
FIG. 18 is a concrete circuit of a phase adjuster used in the conduction control means shown in FIG. 14.

FIG. 18 is a concrete circuit of the phase adjuster 13. A capacitor 30 is charged by the amplifier 12 shown in FIG. 14. This capacitor 30 is connected between the emitter and one of the bases of a double-base transistor 31.

The output of the change-over switch 18 shown in FIG. 14 is applied between the bases of the double-base transistor 31. Between the one base of the double-base transistor 31 and the earth is connected the input winding of a pulse transformer 32 whose output is fed to the distributor 21 shown in FIG. 14. Numerals 33 and 34 to 38 and 39 indicate a synchronous signal input terminal and resistors and a diode.

The phase adjuster 13 is made up of six units 13a to 13f (not shown), each having such a structure as shown in FIG. 18. In the following description, therefore, the parts of the phase adjuster 13 are designated by the corresponding numerals followed by alphabets a to f which indicate corresponding adjuster units 13a to 13f.

Figure 19:
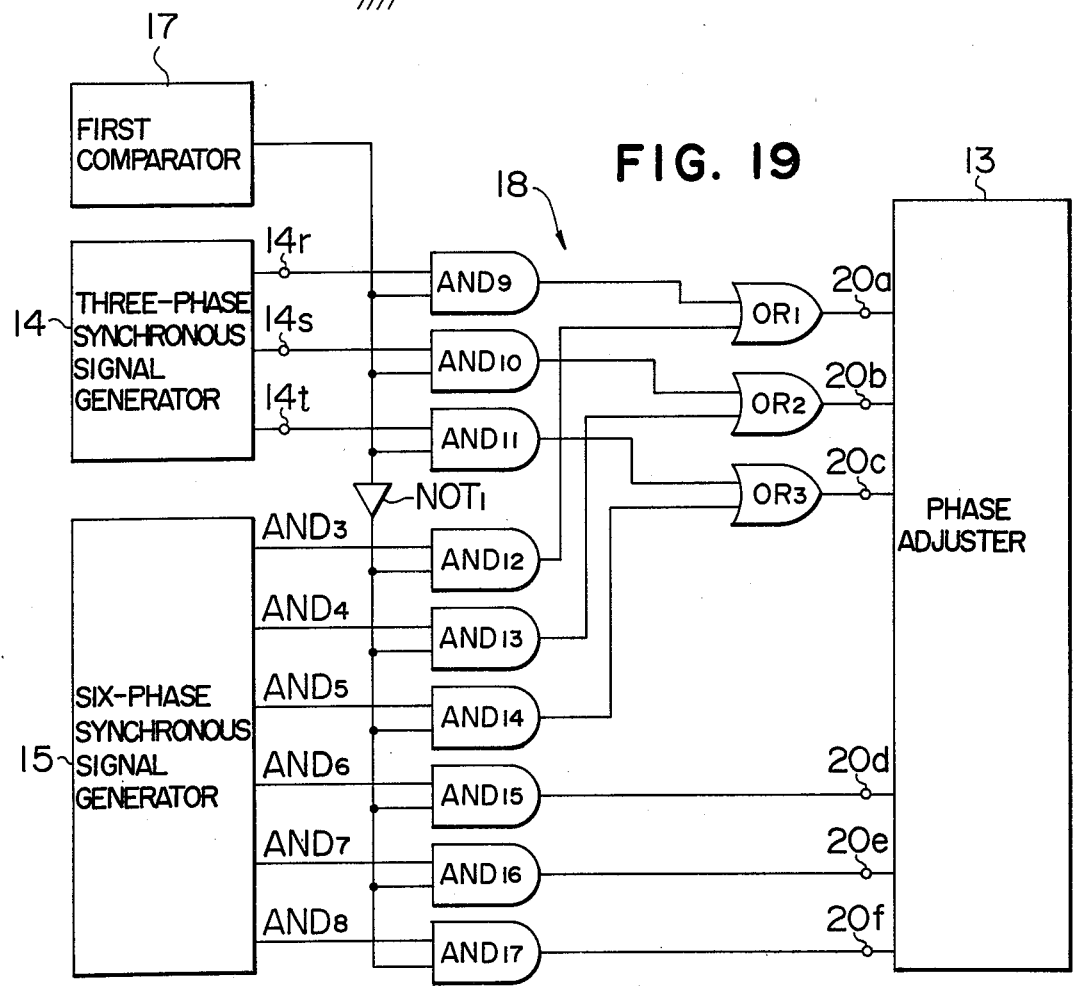
FIG. 19 is a concrete circuit of change-over means used in the conduction control means shown in FIG. 14.

FIG. 19 is a concrete circuit of the changeover switch 18. The three-phase synchronous signal generator 14 has output terminals 14r, 14s and 14t at which three synchronous signals apart in phase from each other by 120° appear. The signals obtained from the terminals 14r, 14s and 14t and the output of the first comparator 17 are logically operated through and circuits $AND_9$ to $AND_{11}$.

The output of the first comparator 17 is inverted by a "not" circuit $NOT_1$. The outputs of $AND_3$ to $AND_8$ and $NOT_1$ are logically operated through and circuits $AND_{12}$ to $AND_{17}$.

The outputs of and circuits $AND_9$ and $AND_{12}$ are fed to an "or" circuit $OR_1$ whose output is applied to the synchronous signal input terminal 33a of the phase adjuster 13.

The outputs of and circuits $AND_{10}$ and $AND_{13}$ are fed to an or circuit $OR_2$ whose output is applied to the synchronous signal input terminal 33b of the phase adjuster 13.

The outputs of and circuits $AND_{11}$ and $AND_{14}$ are fed to an or circuit $OR_3$ whose output is applied to the synchronous signal input terminal 33c of the phase adjuster 13.

The outputs of $AND_{15}$ to $AND_{17}$ are directly fed to the synchronous signal input terminals 33d to 33f of the phase adjuster 13.

With this circuit arrangement, when the output of the speed instructing means 11 exceeds the output of the first reference voltage generator 16, the first comparator 17 delivers an output H so that three-phase synchronous signals are sequentially received at the terminals 33a, 33b and 33c of the phase adjuster 13.

On the other hand, when the output of the speed instructing means 11 is smaller than that of the first reference voltage generator 16, the first comparator 17 delivers an output L so that six-phase synchronous signals are sequentially received at the terminals 33a to 33f.

Figure 20:
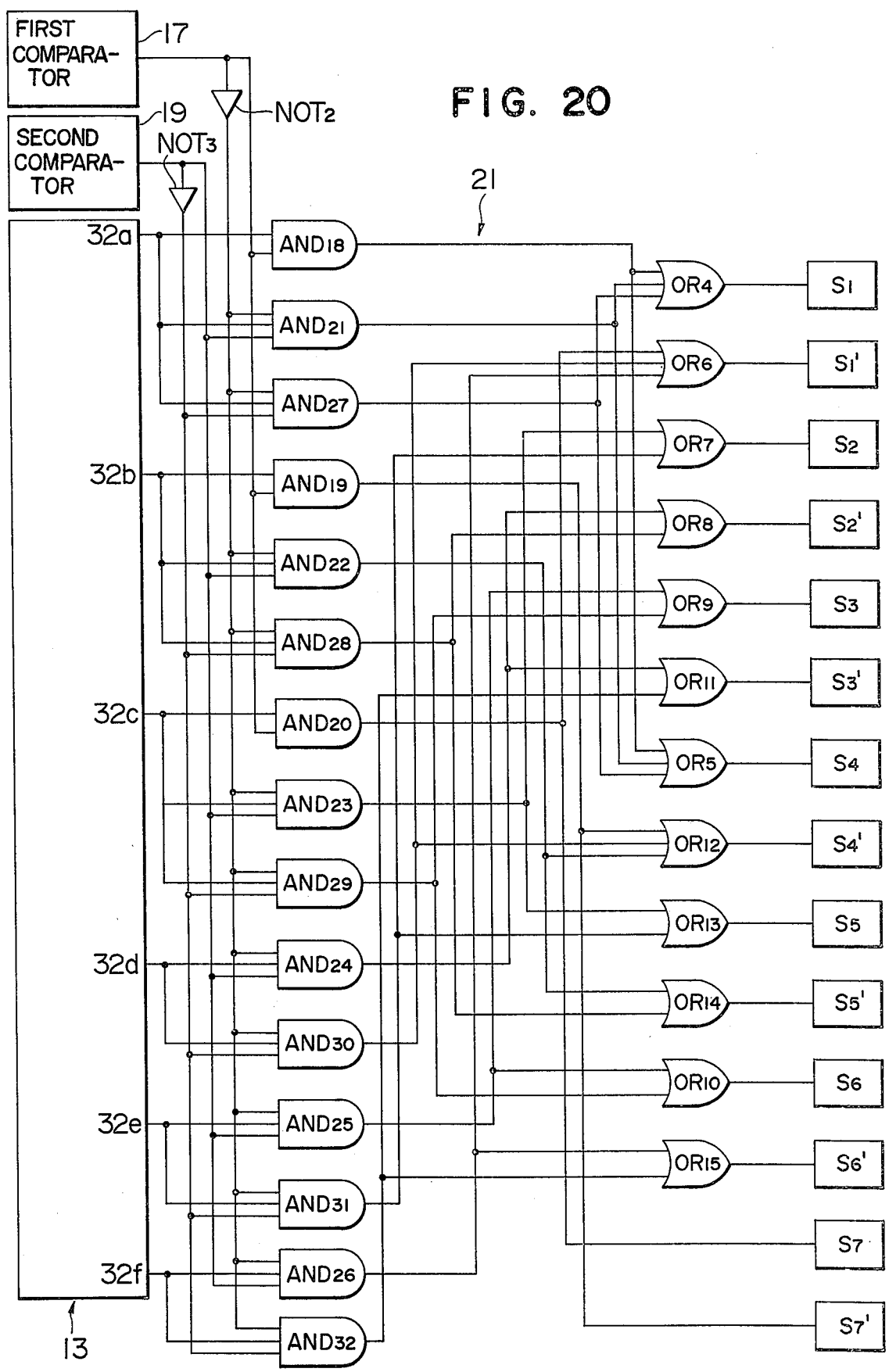
FIG. 20 is a concrete circuit of a distributor used in the conduction control means shown in FIG. 14.

FIG. 20 is a concrete circuit of the distributor 21. Numerals with alphabets 33a to 33f designate pulse transformers whose outputs correspond to those of the phase adjuster 13.

The outputs of the pulse transformers 33a to 33c and the first comparator 17 are logically operated through and circuits $AND_{18}$ to $AND_{20}$.

The output of the first comparator 17 is further inverted through a not circuit $NOT_2$. The outputs of the pulse transformers 33a and the second comparator 19 are logically operated through and circuits $AND_{21}$ and $AND_{26}$.

The output of the second comparator 19 is further inverted through a not circuit $NOT_3$. The outputs of the pulse transformers $33a$ to $33f$ and those of $NOT_2$ and $NOT_3$ are logically operated through and circuits $AND_{27}$ to $AND_{32}$.

The outputs of $AND_{18}$, $AND_{21}$ and $AND_{27}$ are logically operated through or circuits $OR_4$ and $OR_5$ and the outputs of $OR_4$ and $OR_5$ are respectively applied to the gate electrodes of the thyristors $S_1$ and $S_4$.

The outputs of $AND_{20}$, $AND_{30}$ and $AND_{26}$ are logically operated through an or circuit $OR_6$, the output of which is applied to the gate electrode of the thyristor $S_1'$.

The outputs of $AND_{23}$ and $AND_{31}$ are logically operated through an or circuit $OR_7$, the output of which is applied to the gate electrode of the thyristor $S_2$.

The outputs of $AND_{24}$ and $AND_{28}$ are logically operated through an or circuit $OR_8$, the output of which is applied to the gate electrode of the thyristor $S_2'$.

The outputs of $AND_{25}$ and $AND_{29}$ are logically operated through or circuits $OR_9$ and $OR_{10}$, the outputs of which are applied respectively to the gate electrodes of the thyristors $S_3$ and $S_6$.

The outputs of $AND_{24}$ and $AND_{32}$ are logically operated through an or circuit $OR_{11}$, the output of which is applied to the gate electrode of the thyristor $S_3'$.

The outputs of $AND_{19}$, $AND_{22}$ and $AND_{30}$ are logically operated through an or circuit $OR_{12}$, the output of which is applied to the gate electrode of the thyristor $S_4'$.

The outputs of $AND_{23}$ and $AND_{31}$ are logically operated through an or circuit $OR_{13}$, the output of which is applied to the gate electrode of the thyristor $S_5$.

The outputs of $AND_{22}$ and $AND_{28}$ are logically operated through an or circuit $OR_{14}$, the output of which is applied to the gate electrode of the thyristor $S_5'$.

The outputs of $AND_{26}$ and $AND_{32}$ are logically operated through an or circuit $OR_{15}$, the output of which is applied to the gate electrode of the thyristor $S_6'$.

The output of $AND_{20}$ is applied to the gate electrode of the thyristor $S_7$ while the output of $AND_{19}$ is applied to the gate electrode of the thyristor $S_7'$.

With this circuit arrangement, if the output of the speed instructing means 11 exceeds the output of the first reference voltage generator 16, the first comparator 17 delivers an output H. Accordingly, the output of the three-phase synchronous signal generator 14 is fed to the phase adjuster 13 due to the operation of the change-over switch 18. Therefore, the capacitors $30a$, $30b$ and $30c$ of the phase adjuster 13 (see the last paragraph of the description concerning FIG. 18 for $30a$, $30b$, $30c$ etc. which are not shown in the figures) integrate the output of the amplifier 12, the integrations by the capacitors $30a$, $30b$ and $30c$ respectively taking place at phase intervals of 120°. If the integrated values reach predetermined levels, the double-base transistors $31a$, $31b$ and $31c$ conduct sequentially at regular phase intervals. Consequently, the pulse transformers $32a$, $32b$ and $32c$ deliver pulse signals, which are applied to the distributor 21 to be appropriately distributed so that the signal from the pulse transformer $32a$ fires the thyristors $S_1$ and $S_4$, that the signal from the pulse transformer $32b$ fires the thyristors $S_4'$ and $S_7'$ and that the signal from the pulse transformer $32c$ fires the thyristors $S_7$ and $S_1'$. Accordingly, the velocity of the rotating magnetic field of the motor M is $120f/p$ [rpm].

If the output of the speed instructing means 11 is smaller than that of the first reference voltage generator 16 but greater than that of the second reference voltage generator 20, the first comparator 17 delivers an output L. Accordingly, the output of the six-phase synchronous signal generator 15 is fed to the phase adjuster 13 due to the operation of the change-over switch 18. Therefore, the capacitors $30a$ to $30f$ of the phase adjuster 13 start integrating the output of the amplifier 12 at phase intervals of 180°. If the intgerated values reach predetermined levels, the double-base transistors $31a$ to $31f$ conduct sequentially at regular phase intervals. Consequently, the pulse transformers $32a$ to $32f$ deliver pulse signals, which are distributed through the distributor 21 in such a manner as follows since the outputs of the first and second comparators 17 and 19 are respectively L and H. Namely, the signal from the pulse transformer $32a$ fires the thyristors $S_1$ and $S_4$, the signal from the pulse transformer $32b$ fires the thyristors $S_4'$ and $S_5'$, the signal from the pulse transformer $32c$ fires the thyristors $S_5$ and $S_2$, the signal from the pulse transformer $32d$ fires the thyristors $S_2'$ and $S_3'$, the signal from the pulse transformer $32e$ fires the thyristors $S_3$ and $S_6$, the signal from the pulse transformer $32f$ fires thyristors $S_6'$ and $S_1'$. Accordingly, the velocity of the rotating magnetic field of the motor M is $120f/p \times (2/3)$ [rpm].

If the output of the speed instructing means 11 is smaller than that of the second reference voltage generator 20, the first comparator delivers an output L. Accordingly, the pulse transformers $32a$ to $32f$ deliver pulse signals sequentially. Since in this case, the outputs of the first and the second comparators 17 and 19 are both L, the pulse signals are distributed through the distributor 21 in such a manner as follows. Namely, the signal from the pulse transformers $32a$ fires the thyristors $S_1$ and $S_4$, the signal from the pulse transformer $32b$ fires the thyristors $S_2'$ and $S_4'$, the signal from the pulse transformer $32c$ fires the thyristors $S_3$ and $S_6$, the signal from the pulse transformer $32d$ fires the thyristors $S_4'$ and $S_1'$, the signal from the pulse transformer $32e$ fires the thyristors $S_5$ and $S_2$, and the signal from the pulse transformer $32f$ fires the thyristors $S_6'$ and $S_3'$. Accordingly, the velocity of the rotating magnetic field of the motor M is $120f/p \times (1/3)$ [rpm].

In the foregoing description of this specification the present invention has been explained only by way of embodiments and it should be noted that the present invention is by no means limited to those preferred embodiments but that other variations, altenations or modifications are easily thought of by those skilled in the art.

We claim:

1. A device for controlling the speed of a three-phase induction motor, comprising six arms, each consisting of two thyristors arranged in inverse parallel connection, wherein three units are formed, each consisting of two arms connected in series with each other; said units are connected in parallel with each other between two of the three phases of a three-phase a.c. power source; and the junction points of said arms connected in series are connected with the primary winding of said motor.

2. A device for controlling the speed of a three-phase induction motor, comprising six arms, each being an FLS, wherein three units are formed, each consisting of two arms connected in series with each other; said units are connected in parallel to each other and between two of the three phases of a three-phase a.c. power source; the junction points of said arms connected in series are connected with the primary winding of said motor; and a circuit of two thyristors arranged in inverse parallel connection is connected between one of said junction points and the remaining phase of said three-phase power source.

* * * * *